United States Patent
Sollami et al.

(10) Patent No.: US 11,989,858 B2
(45) Date of Patent: May 21, 2024

(54) SYSTEMS AND METHODS OF DETERMINING MARGINS OF AN IMAGE FOR CONTENT INSERTION TO FORM A COMPOSITE IMAGE

(71) Applicant: Salesforce, Inc., San Francisco, CA (US)

(72) Inventors: Michael Sollami, Cambridge, MA (US); Jessica Lundin, Bellevue, WA (US)

(73) Assignee: Salesforce, Inc., San Francisco, CA (US)

(*) Notice: Subject to any disclaimer, the term of this patent is extended or adjusted under 35 U.S.C. 154(b) by 83 days.

(21) Appl. No.: 17/957,545

(22) Filed: Sep. 30, 2022

(65) Prior Publication Data

US 2024/0112304 A1 Apr. 4, 2024

(51) Int. Cl.
| | |
|---|---|
| G06T 5/50 | (2006.01) |
| G06T 7/13 | (2017.01) |
| G06V 10/46 | (2022.01) |

(52) U.S. Cl.
CPC ............. *G06T 5/50* (2013.01); *G06T 7/13* (2017.01); *G06V 10/462* (2022.01); *G06T 2207/20024* (2013.01); *G06T 2207/20221* (2013.01)

(58) Field of Classification Search
CPC ........... G06V 10/462; G06T 5/50; G06T 7/13; G06T 2207/20024; G06T 2207/20221
USPC .......................................................... 345/629
See application file for complete search history.

(56) References Cited

U.S. PATENT DOCUMENTS

| | | | |
|---|---|---|---|
| 9,369,445 B2 | 6/2016 | Mahajan | |
| 9,716,695 B2 | 7/2017 | Mahajan | |
| 10,515,137 B1* | 12/2019 | Sirota | G06F 40/14 |
| 11,074,044 B1 | 7/2021 | Schoppe | |
| 11,250,572 B2 | 2/2022 | Sollami | |
| 11,373,343 B2 | 6/2022 | Sollami | |
| 11,379,189 B1 | 7/2022 | Schoppe | |
| 2012/0079370 A1* | 3/2012 | Dejean | G06V 30/414 715/246 |
| 2017/0300868 A1 | 10/2017 | Johnson | |
| 2017/0300869 A1 | 10/2017 | Johnson | |
| 2018/0056130 A1 | 3/2018 | Bitran | |
| 2018/0060500 A1 | 3/2018 | Ni | |
| 2018/0089372 A1 | 3/2018 | Bitran | |
| 2018/0101807 A1 | 4/2018 | Ni | |
| 2018/0107793 A1 | 4/2018 | Ni | |

(Continued)

*Primary Examiner* — Jacinta M Crawford
(74) *Attorney, Agent, or Firm* — Butzel Long (57) ABSTRACT

Systems and methods are provided for determining a first upper bound of a x-direction frame margin of a downsampled image and a second upper bound for a y-direction frame margin of the downsampled image. A total value for each row and column of a weighted grayscale image formed from the downsampled image may be determined. An outlier filtering may be applied to the determined total values for each row and column of the weighted grayscale image. A peak of pairwise ratios of consecutive values from left and right sides of the weighted grayscale image may be used to determine an x-margin, and a peak of pairwise ratios of consecutive values from top and bottom sides of the weighted grayscale image may be used to determine a y-margin. Content may be applied to the image based on the determined x-margin and y-margin values to form a composite image.

16 Claims, 7 Drawing Sheets

(56) References Cited

U.S. PATENT DOCUMENTS

| | | |
|---|---|---|
| 2018/0107962 A1 | 4/2018 | Lundin |
| 2018/0196881 A1 | 7/2018 | Lundin |
| 2018/0300664 A1 | 10/2018 | Ni |
| 2020/0097570 A1 | 3/2020 | Sollami |
| 2021/0012257 A1 | 1/2021 | Ni |
| 2021/0103969 A1 | 4/2021 | Sollami |
| 2021/0103970 A1 | 4/2021 | Sollami |
| 2021/0117484 A1 | 4/2021 | Sollami |
| 2021/0117773 A1 | 4/2021 | Sollami |
| 2021/0118024 A1 | 4/2021 | Sollami |
| 2021/0149961 A1 | 5/2021 | Lonsdorf |
| 2021/0240318 A1 | 8/2021 | Schoppe |
| 2021/0240319 A1 | 8/2021 | Schoppe |
| 2021/0240320 A1 | 8/2021 | Woodward |
| 2021/0240451 A1 | 8/2021 | Schoppe |
| 2021/0240452 A1 | 8/2021 | Schoppe |
| 2021/0240501 A1 | 8/2021 | Woodward |
| 2021/0240910 A1 | 8/2021 | Lundin |
| 2021/0334666 A1 | 10/2021 | Lundin |
| 2022/0050667 A1 | 2/2022 | Schoppe |
| 2022/0114349 A1 | 4/2022 | Sollami |
| 2022/0180581 A1 | 6/2022 | Lundin |
| 2022/0222046 A1 | 7/2022 | Schoppe |
| 2022/0245322 A1 | 8/2022 | Lundin |
| 2022/0245820 A1 | 8/2022 | Ross |
| 2022/0284641 A1 | 9/2022 | Sollami |

* cited by examiner

SYSTEMS AND METHODS OF DETERMINING MARGINS OF AN IMAGE FOR CONTENT INSERTION TO FORM A COMPOSITE IMAGE

BACKGROUND

Margins are typically an important aesthetic component to design composition of text placed on images. Presently, selecting a margin width is performed by hand by a trained designer in the composition process, where the designer uses software to select the margins for a design composition. A basic margin is typically a frame of arbitrary and equal width that is inset from each of the edges of a composition.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Margins are typically an important aesthetic component to a design composition that includes text placed on an image. Presently, selecting a margin width is performed by a trained designer in the composition process, where the designer uses software to select the margins for a design composition. A basic margin can be a frame of arbitrary and equal width that is inset from each of the edges of a composition. The margin typically maintains symmetry for two pairs: a top and bottom pair of the image, and a right and left pair of the image. Margins generally align with the framing created by patterns, colors and textures of the image. It is undesirable for margins to intersect where the eye is drawn in the image. For example, it is typically undesirable for margins to intersect at human faces in an image. It is desirable for margins may have symmetry for a top and bottom portions of the image, and a right and left portions of the image. Margins may align with framing created by patterns, colors, and textures of the image.

That is, selecting margins and adding content to an image is presently done by hand, where a trained designer selects a margin width in the composition process. Such a designer typically uses software such as Figma™, Sketch™, or Photoshop™ to generate a composite image from an initial image and content to be added to the image.

Implementations of the disclosed subject matter provide systems and methods of determining margins of an image to determine a position for content to be added to the image to form a composite image. The alpha channel may be removed from the image, and the resultant image may be downsampled. An upper bound for an x-direction frame margin and an upper bound for a y-direction may be determined from the downsampled image. Saliency, edge detection, and a gradient filter of the image may be determined and may be combined into a weighted grayscale image. The total values for each row and column of the image may be determined from the weighted grayscale image. Outlier filtering may be applied to the determined total values for each row and column of the weighted grayscale image. A peak of pairwise ratios of consecutive values for left and right sides of the weighted grayscale image may be determined by setting a maximum value to be an x-margin. Similarly, a peak of pairwise ratios of consecutive values for top and bottom sides of the weighted grayscale image may be determined by setting a maximum value to be a y-margin. Content may be applied to the image based on the determined x-margin and y-margin values to form the composite image.

Implementations of the disclosed subject matter may reduce the computational resources used to determine areas of placement for content (e.g., text, graphics, additional images, and the like) to be added to an image. Implementations of the disclosed subject matter may provide uniform, consistent, and/or repeatable placement of content within images when forming composite images. The resulting composite images may have visual consistency of spacing, composition, and/or arrangement between an original image and added content. Such consistency of spacing, composition, and/or arrangement may be maintained for different images and for different content to be added, including different types of content (e.g., text, graphics, images, or the like) and sizes of content.

Figure 1:
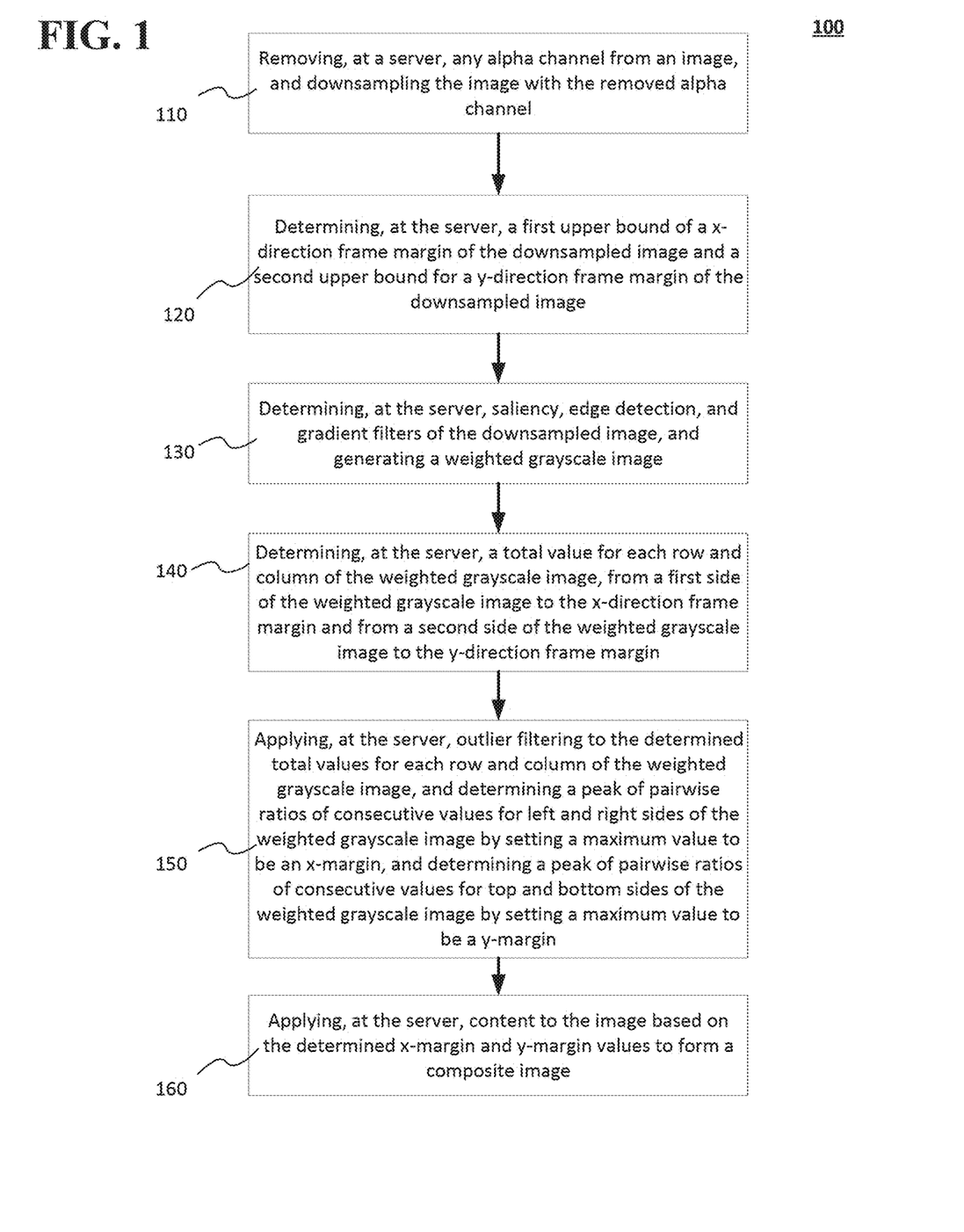
FIG. 1 shows an example method of determining margins of an image for content insertion to form a composite image according to an implementation of the disclosed subject matter.
Figure 2A:
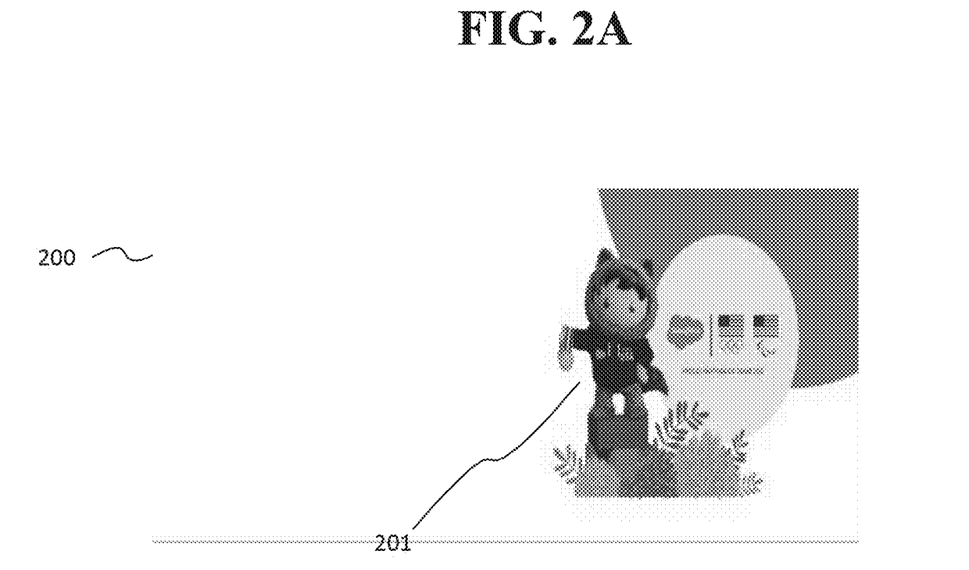
FIG. 2A shows an example image for which margins may be determined according to an implementation of the disclosed subject matter.

FIG. 1 shows an example method 100 of determining margins of an image for content insertion to form a composite image according to an implementation of the disclosed subject matter. At operation 110, a server (e.g., server 700 shown in FIG. 3) may remove any alpha channel from an image and may downsample the image with the removed alpha channel. For example, an initial image from which the alpha channel may be removed may be image 200 that includes graphic 201 as shown in FIG. 2A. The alpha channel of an image may be a channel that handles transparency. When an image has an alpha channel, the image's opacity levels may be adjusted to make the bits translucent and/or transparent. The alpha channel may be used to remove a background from the image. In some implementations, the alpha channel may be removed, so that the red (R), green (G), and blue (B) channels of image information remain. That is, the alpha channel of the image may not be needed in determining margins of the image and adding content to form a composite image, so the alpha channel may be removed to reduce the computational resources needed to determine the margins and generate a composite image.

Figure 2B:
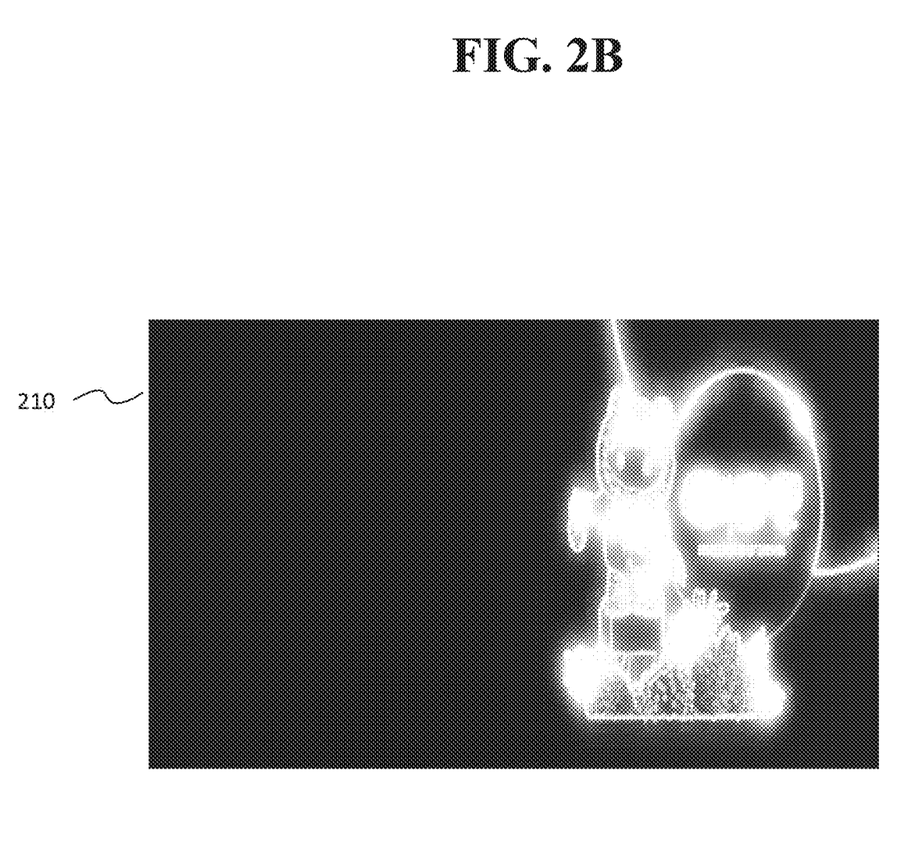
FIG. 2B shows a weighted grayscale image of the image of FIG. 2A that has been downsampled and which has the alpha channel removed according to an implementation of the disclosed subject matter.

When the alpha channel of image 200 has been removed, the server may downsample the image, which may reduce the resolution of the image. Reducing the resolution may reduce the amount of computational resources used in subsequent operations of example method 100, as the lower resolution may reduce the computational complexity for pixel-wise calculations. The downsampling may reduce and/or eliminate image artifacts and may smooth the image. FIG. 2B shows image 210, which is the image 200 of FIG. 2A with the alpha channel removed and which has been downsampled at operation 110.

At operation 120, the server may determine a first upper bound of an x-direction frame margin (i.e., a maximum value of the frame margin in the x-direction) of the downsampled image and a second upper bound for a y-direction frame margin (i.e., a maximum value of the frame margin in the y-direction) of the downsampled image. In some implementations, the first upper bound and the second upper bound may be determined based on an aspect ratio of the downsampled image and a resolution of the downsampled image. Determining the upper bounds of the x-direction and y-direction frame margins may be used to generate margins for placement of content in the image that results in a visually balanced image between content (e.g., text, images, graphics, and the like) and space.

At operation 130, the server may determine saliency, edge detection, and gradient filters of the downsampled image, and may generate a weighted grayscale image. Saliency may be determined based on color, intensity, and/or orientation of the image. For example, saliency may be determined by combining multiscale image features into a single topographical saliency map. A dynamical neural network that may be part of and/or communicatively coupled to the server may select locations in order of decreasing saliency. Edges of the downsampled image may be determined, for example, at the server using a Bessel derivative kernel. The Bessel derivative kernel may use first order derivatives to determine the edges of the image. A convolution kernel may be applied by the server to the x-component and y-component derivatives and combine them. The gradient filter may be based on a radius of the filter. For example, the Bessel derivative kernel used by the server may be used with a gradient filter with a radius of one (1). This is merely an example of a radius, and other suitable radius values may be used.

In some implementations, edges of the downsampled image may be determined using a Sobel filter. A gradient of image intensity of the downsampled image may be determined at each pixel within the downsampled image. The direction of the largest increase from light to dark may be determined, along with a rate of change in the determined direction. That is, a spatial gradient measurement may be performed on the downsampled image to emphasize regions of high spatial frequency that correspond to images. Sobel edge detection may be used to find the approximate absolute gradient magnitude at each point in the downsampled image or a grayscale image.

Figure 2C:
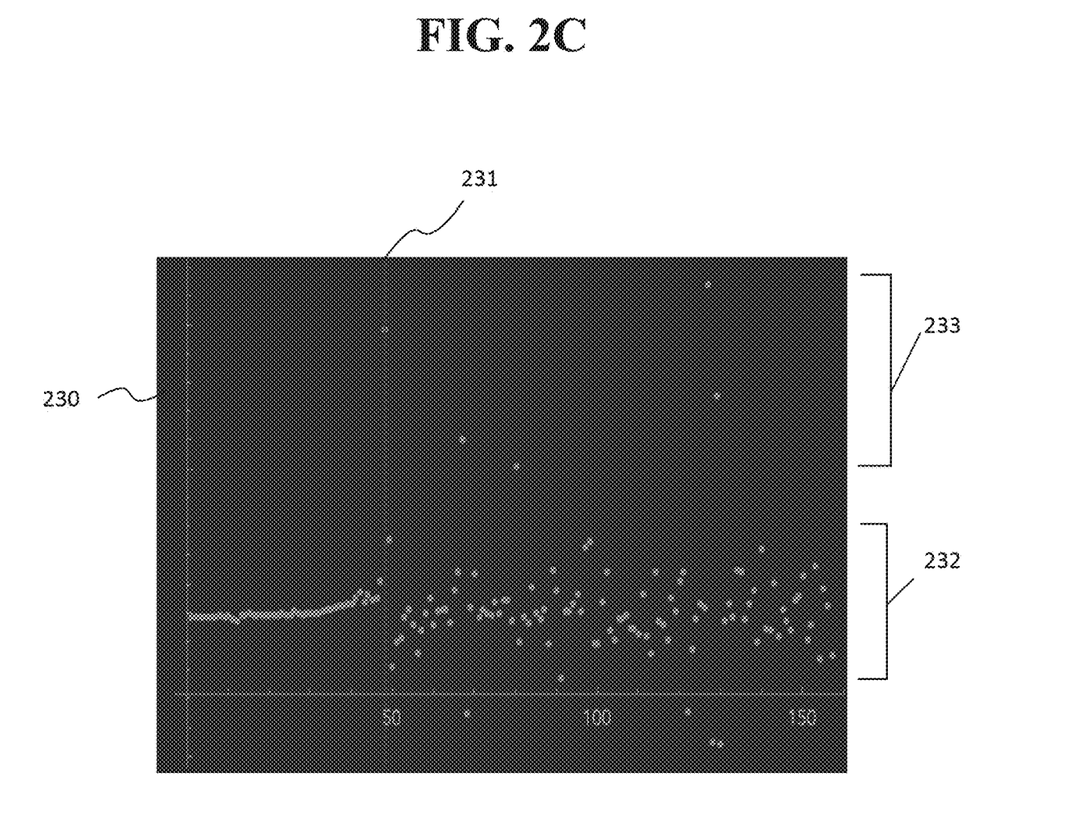
FIG. 2C shows the determining of the x-direction frame margin and y-direction frame margin of the image of FIG. 2B according to an implementation of the disclosed subject matter.

The server may use the downsampled image 210 shown in FIG. 2B to determine the saliency, edge detection, and gradient filters, and may generate the weighted grayscale image 220, shown in FIG. 2C. The weighted grayscale image may be determined based on the determined saliency, edge detection, and gradient filters. In some implementations, the weighted grayscale image may have a ratio of 1:4:4 for the saliency, edge detection, and gradient filters (e.g., saliency+(4*gradient)+(4*edge detection)). In this example, gradient and edges may have increased weighting over saliency. The 1:4:4 ratio is merely an example, and other ratios between the saliency, gradient, and edge detection may be used. In some implementations, the resulting image (i.e., the grayscale image) may be normalized.

At operation 140, the server may determine a total value for each row and column of the weighted grayscale image, from a first side of the weighted grayscale image to the x-direction frame margin and from a second side of the weighted grayscale image to the y-direction frame margin. This operation may effectively flatten the image into a one-dimensional image. The rows may be the rows of pixels in the weighted grayscale image, and the columns may be the columns of pixels in the weighted grayscale image. Operation 140 may total (i.e., add) the values in each row and column. For example, the weighted grayscale image maybe a matrix of values between 0 and 1, and operation 140 may total the values in each row (i.e., the x-direction), and total the values in each column (i.e., the y-direction) of the image.

FIG. 2C shows a chart 230 of the values for the grayscale image in at least the x-direction. As line 231 sweeps in the x-direction, the x-direction values may be combined to find a total value for the rows of the weighted grayscale image. Similarly, the y-direction values may be combined in the y-direction to determine a total value for the columns of the weighted grayscale image. That is, chart 230 shows the detection of the boundaries in the x-direction and y-direction by operation 140.

At operation 150, the server may apply outlier filtering to the determined total values for each row and column of the weighted grayscale image. This outlier filtering may remove artifacts from the image. For example, as shown in FIG. 2C, the outlier filtering may determine that datapoints in area 233 are outliers in comparison to the datapoints in area 232 which are clustered together. The outlier values may be removed by the filtering. Outlier values may be values that are a predetermined distance and/or value from an average value in the image.

Figure 2D:
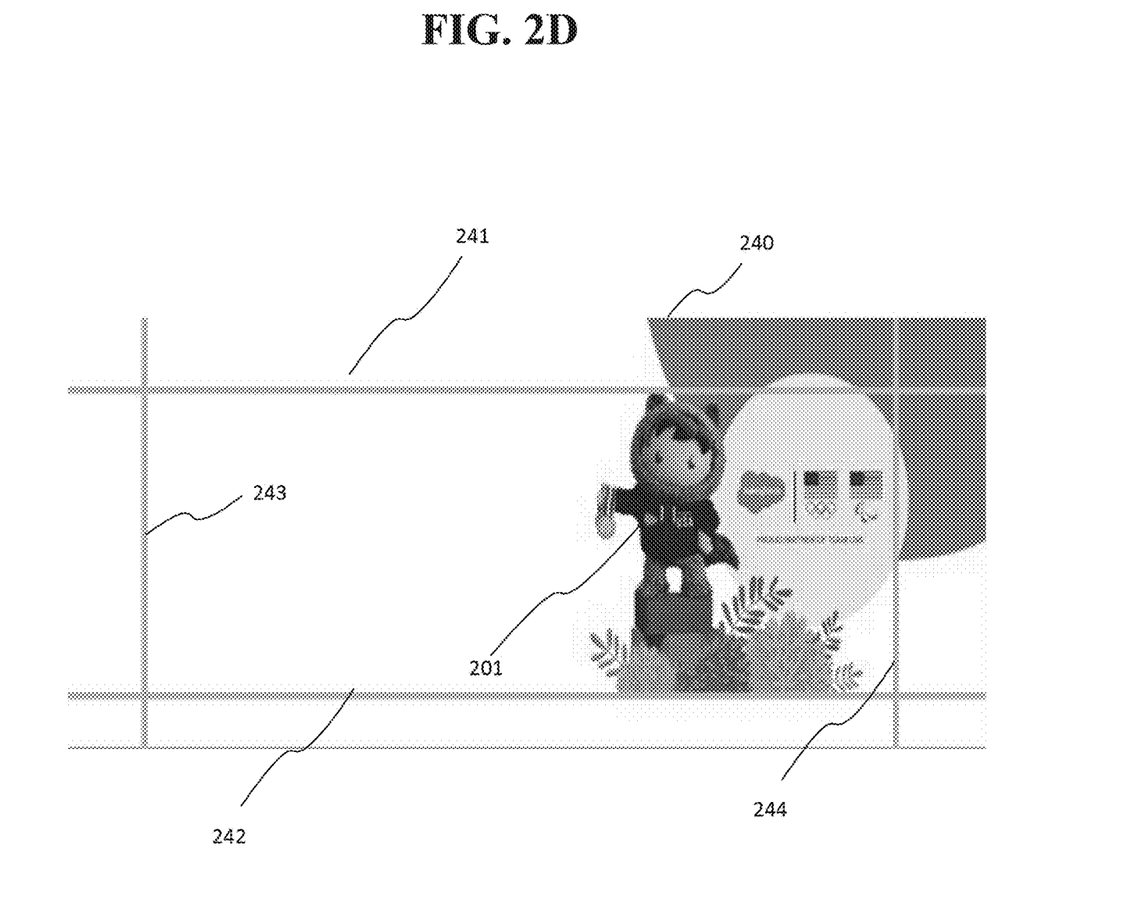
FIG. 2D shows the example image of FIG. 2A with the determined margins according to an implementation of the disclosed subject matter.

The server may determine a peak of pairwise ratios of consecutive values for left and right sides of the weighted grayscale image by setting a maximum value to be an x-margin for the image at operation 150. The server may similarly determine a peak of pairwise ratios of consecutive values for top and bottom sides of the weighted grayscale image by setting a maximum value to be a y-margin for the image. Operation 150 may determine the top n values in the x-direction and y-direction of the image, where the maximum ratio in consecutive values in each direction may be determined. That is, the set x-margin and y-margin values may be the determined margins of the image to which content may be added to the image within the confines of the determined margins. FIG. 2D shows the example image 240 that includes the graphic 201 of FIG. 2A with the determined x-margins (e.g., margins 241, 242) and the determined y-margins (e.g., margins 243, 244).

Figure 2E:
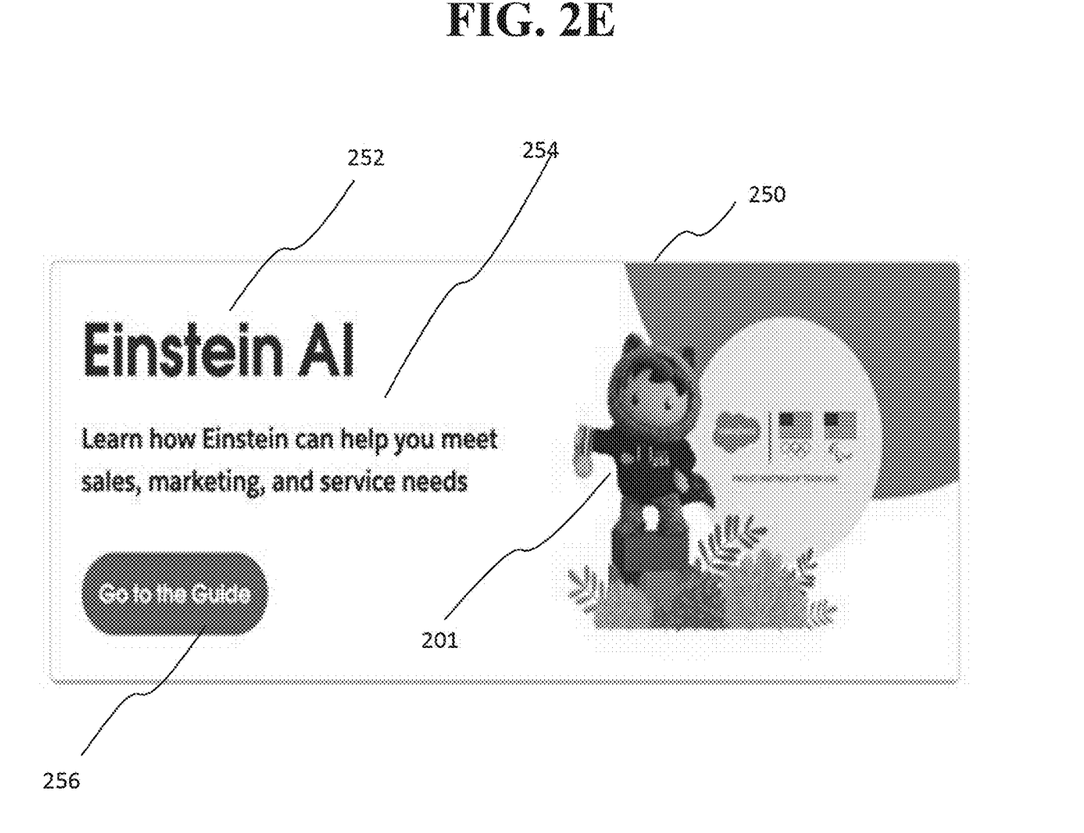
FIG. 2E shows an example composite image of the image of FIG. 2A with added content based on the margins shown in FIG. 2D according to an implementation of the disclosed subject matter.

At operation 160, the server may apply content to the image based on the determined x-margin and y-margin values to form a composite image. For example, the content may include text, graphics, and/or an image, or the like. When the server applies the content, the server may place the content at an edge of the x-margin and/or the y-margin. FIG. 2E shows an example composite image 250 with the graphic 201 form the image 200 of FIG. 2A with added content that include title 252, text 254, and button 256 based on the margins of FIG. 2D. Although FIG. 2E shows that the added content includes a tile, text, and a button, these are merely examples of added content, and content to be added may include text, graphics, and/or an image, or the like. In some implementations, the server may place the content (e.g., title 252, text 264, and button 256 at a predetermined distance from the x-margin and/or the y-margin.

If edges of the content are close to the margin (e.g., the x-margin and/or the y-margin), a threshold may be set by the server. The threshold may determine whether the content to be added "snaps" to at least one of the determined margin (i.e., directly fits to the x-margin and/or y-margin) or is spaced a predetermined distance from a least one of the determined margins.

In some implementations, the server may output the composite image for display. For example, in the system shown in FIG. 3 and described below, the server 700 may transmit the composite image via communications network 600 to be displayed on display 520 of computer 500.

Figure 3:
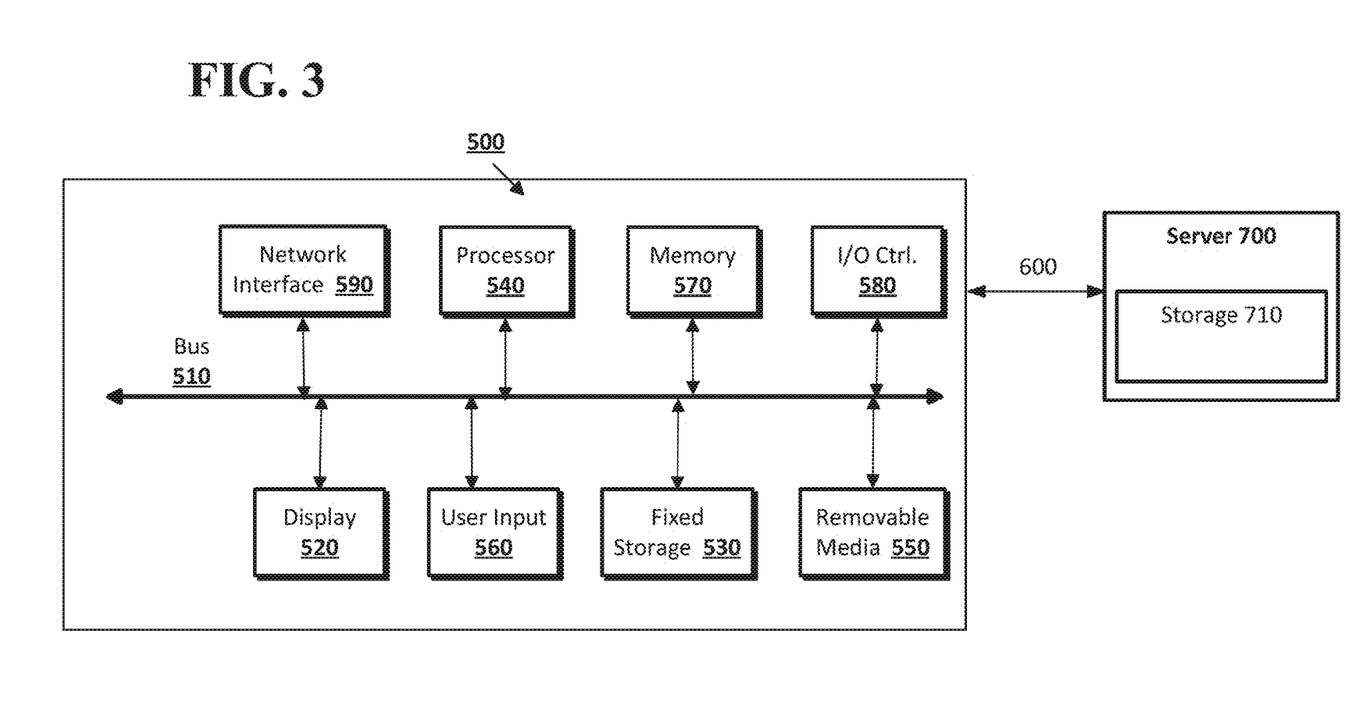
FIG. 3 shows a computer system according to an implementation of the disclosed subject matter.

Implementations of the presently disclosed subject matter may be implemented in and used with a variety of component and network architectures. FIG. 3 is an example computer 500 suitable for the implementations of the presently disclosed subject matter. As discussed in further detail herein, the computer 500 may be a single computer in a network of multiple computers. In some implementations, the computer 500 may be used to select content to be added to an image (e.g., text, graphics, images, and the like), and/or output the generated composite image. As shown in FIG. 3, the computer 500 may communicate with a server 700 (e.g., a server, cloud server, database, cluster, application server, neural network system, or the like) via a wired and/or wireless communications network 600. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 of the server 700 can store data, such as content to be added to an image, generated composite images, gradient filters, Bessel filters, Sobel filters, outlier filters, and the like. Further, if the server 700 and/or storage 710 is a multitenant system, the storage 710 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 9 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

In some implementations, the server shown in FIG. 3 can store content to be added to an image, generated composite images, gradient filters, Bessel filters, Sobel filters, outlier filters, and the like in the immutable storage of the at least one storage device (e.g., storage 710) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multi-tenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "removing," "determining," "applying," "outputting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
    removing, at a server, any alpha channel from an image, and downsampling the image with the removed alpha channel;
    determining, at the server, a first upper bound of a x-direction frame margin of the downsampled image and a second upper bound for a y-direction frame margin of the downsampled image;
    determining, at the server, saliency, edge detection, and gradient filters of the downsampled image, and generating a weighted grayscale image;
    determining, at the server, a total value for each row and column of the weighted grayscale image, from a first side of the weighted grayscale image to the x-direction frame margin and from a second side of the weighted grayscale image to the y-direction frame margin;
    applying, at the server, outlier filtering to the determined total values for each row and column of the weighted grayscale image, and determining a peak of pairwise ratios of consecutive values for left and right sides of the weighted grayscale image by setting a maximum value to be an x-margin, and determining a peak of pairwise ratios of consecutive values for top and bottom sides of the weighted grayscale image by setting a maximum value to be a y-margin; and applying, at the server, content to the image based on the determined x-margin and y-margin values to form a composite image.

2. The method of claim 1, wherein the first upper bound and the second upper bound are determined based on an aspect ratio of the downsampled image and a resolution of the downsampled image.

3. The method of claim 1, wherein the weighted grayscale image is determined based on the determined saliency, edge detection, and gradient filters.

4. The method of claim 1, wherein the weighted grayscale image has a ratio of 1:4:4 for the that saliency, edge detection, and gradient filters.

5. The method of claim 1, wherein the content includes at least one selected from the group consisting of: text, graphics, and an image.

6. The method of claim 1, wherein the applying the content comprises placing the content at an edge of at least one selected from the group consisting of: the x-margin, and the y-margin.

7. The method of claim 1, wherein the applying the content comprises placing the content at a predetermined distance from at least one selected from the group consisting of: the x-margin, and the y-margin.

8. The method of claim 1, further comprising:
outputting, at the server, the composite image for display.

9. A system comprising:
a server having a processor and a memory to:
   remove any alpha channel from an image, and downsample the image with the removed alpha channel;
   determine a first upper bound of a x-direction frame margin of the downsampled image and a second upper bound for a y-direction frame margin of the downsampled image;
   determine saliency, edge detection, and gradient filters of the downsampled image, and generating a weighted grayscale image;
   determine a total value for each row and column of the weighted grayscale image, from a first side of the weighted grayscale image to the x-direction frame margin and from a second side of the weighted grayscale image to the y-direction frame margin;
   apply outlier filtering to the determined total values for each row and column of the weighted grayscale image, and determining a peak of pairwise ratios of consecutive values for left and right sides of the weighted grayscale image by setting a maximum value to be an x-margin, and determining a peak of pairwise ratios of consecutive values for top and bottom sides of the weighted grayscale image by setting a maximum value to be a y-margin; and
   apply content to the image based on the determined x-margin and y-margin values to form a composite image.

10. The system of claim 9, wherein the first upper bound and the second upper bound are determined based on an aspect ratio of the downsampled image and a resolution of the downsampled image.

11. The system of claim 9, wherein the weighted grayscale image is determined based on the determined saliency, edge detection, and gradient filters.

12. The system of claim 9, wherein the weighted grayscale image has a ratio of 1:4:4 for the that saliency, edge detection, and gradient filters.

13. The system of claim 9, wherein the content includes at least one selected from the group consisting of: text, graphics, and an image.

14. The system of claim 9, wherein the server applies the content by placing the content at an edge of at least one selected from the group consisting of: the x-margin, and the y-margin.

15. The system of claim 9, wherein the server applies the content by placing the content at a predetermined distance from at least one selected from the group consisting of: the x-margin, and the y-margin.

16. The system of claim 9, wherein the server outputs the composite image for display.

* * * * *